(12) United States Patent
Yoo et al.

(10) Patent No.: US 8,081,860 B2
(45) Date of Patent: Dec. 20, 2011

(54) RECORDING MEDIUM AND RECORDING AND REPRODUCING METHODS AND APPARATUSES

(75) Inventors: Jea Yong Yoo, Seoul (KR); Kang Soo Seo, Anyang-si (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1547 days.

(21) Appl. No.: 10/957,587

(22) Filed: Oct. 5, 2004

(65) Prior Publication Data
US 2005/0169607 A1    Aug. 4, 2005

(30) Foreign Application Priority Data
Feb. 3, 2004  (KR) .................. 10-2004-0006990

(51) Int. Cl.
*H04N 9/80* (2006.01)
(52) U.S. Cl. ........................................................ 386/239
(58) Field of Classification Search .................... 386/95, 386/46, 52, 125–126, 98
See application file for complete search history.

(56) References Cited

U.S. PATENT DOCUMENTS

| | | | |
|---|---|---|---|
| 5,294,982 A | 3/1994 | Salomon et al. | |
| 5,627,594 A | 5/1997 | Van Gestel | |
| 5,748,256 A | 5/1998 | Tsukagoshi | |
| 5,848,217 A * | 12/1998 | Tsukagoshi et al. | 386/68 |
| 5,889,564 A | 3/1999 | Tsukagoshi | |
| 5,926,647 A | 7/1999 | Adams et al. | |
| 5,949,752 A | 9/1999 | Glynn et al. | |
| 5,999,225 A | 12/1999 | Yagasaki et al. | |
| 6,046,778 A * | 4/2000 | Nonomura et al. | 348/565 |
| 6,167,410 A | 12/2000 | Imamura | |
| 6,204,883 B1 | 3/2001 | Tsukagoshi | |
| 6,259,858 B1 | 7/2001 | Ando et al. | |
| 6,262,775 B1 | 7/2001 | Kim | |
| 6,288,990 B1 | 9/2001 | Fujiie et al. | |
| 6,345,147 B1 * | 2/2002 | Mimura et al. | 386/97 |
| 6,553,180 B1 * | 4/2003 | Kikuchi et al. | 386/95 |
| 0,081,434 A1 | 4/2004 | Jung et al. | |
| 7,106,381 B2 | 9/2006 | Molaro et al. | |
| 7,236,687 B2 | 6/2007 | Kato et al. | |

(Continued)

FOREIGN PATENT DOCUMENTS

CN        1130786        9/1996
(Continued)

OTHER PUBLICATIONS

"Understanding SAMI.0" [Online] Feb. 2003, WZ007902747, retrieved from the Internet: URL:http://msdn2.microsoft.com/enus/library/ms971327(d=printer).aspx> [retrieved on Aug. 14, 2007].

(Continued)

*Primary Examiner* — William C Vaughn, Jr.
*Assistant Examiner* — Tat Chio
(74) *Attorney, Agent, or Firm* — Harness, Dickey & Pierce, P.L.C.

(57) ABSTRACT

A recording medium includes a data area which stores at least one text subtitle stream. Each text subtitle stream includes text data to be displayed within a text subtitle region, region style information specifying a region style of the text subtitle region including an overall style of the text data, and inline style information for applying a different style to a specific portion of the text data within the text subtitle region.

27 Claims, 12 Drawing Sheets

U.S. PATENT DOCUMENTS

| | | | |
|---|---|---|---|
| 7,561,780 B2 | 7/2009 | Seo et al. | |
| 7,593,060 B2 | 9/2009 | Yoo et al. | |
| 2001/0030710 A1* | 10/2001 | Werner | 348/467 |
| 2002/0087999 A1 | 7/2002 | Kashima | |
| 2002/0135607 A1 | 9/2002 | Kato et al. | |
| 2002/0194618 A1 | 12/2002 | Okada et al. | |
| 2003/0012558 A1 | 1/2003 | Kim et al. | |
| 2003/0039472 A1 | 2/2003 | Kim | |
| 2003/0099464 A1 | 5/2003 | Oh et al. | |
| 2003/0188312 A1* | 10/2003 | Bae et al. | 725/55 |
| 2003/0202431 A1 | 10/2003 | Kim et al. | |
| 2003/0235404 A1 | 12/2003 | Seo et al. | |
| 2004/0001699 A1 | 1/2004 | Seo et al. | |
| 2004/0202454 A1* | 10/2004 | Kim et al. | 386/95 |
| 2005/0058435 A1 | 3/2005 | Chung et al. | |
| 2005/0191035 A1 | 9/2005 | Jung et al. | |
| 2005/0196147 A1 | 9/2005 | Seo et al. | |
| 2005/0198053 A1 | 9/2005 | Seo et al. | |
| 2006/0013563 A1 | 1/2006 | Adolph et al. | |
| 2007/0098367 A1 | 5/2007 | Yoo et al. | |

FOREIGN PATENT DOCUMENTS

| | | |
|---|---|---|
| CN | 1139273 | 1/1997 |
| CN | 1140311 | 1/1997 |
| CN | 1214499 | 4/1999 |
| CN | 1264894 | 8/2000 |
| CN | 1348588 | 5/2002 |
| EP | 0 690 335 | 1/1996 |
| EP | 0 700 211 | 3/1996 |
| EP | 0 734 181 A2 | 9/1996 |
| EP | 0 969 444 | 1/2000 |
| EP | 1 173 031 | 1/2002 |
| EP | 1 178 691 | 2/2002 |
| EP | 1 326 451 | 7/2003 |
| EP | 1 326 451 A1 | 7/2003 |
| EP | 1 400 968 | 3/2004 |
| EP | 1 420 580 | 5/2004 |
| JP | 8-241068 | 9/1996 |
| JP | 9-102940 | 4/1997 |
| JP | 9-115270 | 5/1997 |
| JP | 10-191222 | 7/1998 |
| JP | 11-232849 | 8/1999 |
| JP | 11-252459 | 9/1999 |
| JP | 11-252518 | 9/1999 |
| JP | 2002-027386 | 1/2002 |
| JP | 2002-199354 | 7/2002 |
| JP | 2002-374494 | 12/2002 |
| JP | 3-402533 | 5/2003 |
| JP | 2003-173621 | 6/2003 |
| JP | 2004-194131 | 7/2004 |
| JP | 2006-550924 | 10/2004 |
| JP | 2007-523437 | 8/2007 |
| JP | 2007-525904 | 9/2007 |
| JP | 2007-309215 | 11/2007 |
| KR | 1999-0048985 | 7/1999 |
| KR | 10-0384611 | 5/2003 |
| KR | 2003-0061953 | 7/2003 |
| KR | 2004-0034403 | 4/2004 |
| RU | 2129758 | 4/1999 |
| RU | 2000123689 | 11/1999 |
| RU | 2006 120 480 | 11/2004 |
| TW | I238391 | 1/2003 |
| WO | WO 0036600 | 6/2000 |
| WO | WO 01/48756 | 7/2001 |
| WO | WO 02/063878 | 8/2002 |
| WO | WO 03/056560 | 7/2003 |
| WO | WO 2004/036574 | 4/2004 |
| WO | WO 2004/090885 | 10/2004 |
| WO | WO 2005/031740 | 4/2005 |
| WO | WO 2005/045835 | 5/2005 |
| WO | WO 2005/065055 | 7/2005 |
| WO | WO 2005/074400 | 8/2005 |
| WO | WO 2005/076276 | 8/2005 |
| WO | WO 2005/076609 | 8/2005 |
| WO | WO 2005/079171 | 9/2005 |
| WO | WO 2005/083708 | 9/2005 |

OTHER PUBLICATIONS

European Telecommunications Standards Institute: "Digital Video Broadcasting (DVB); Subtitling Systems" ETSI Standards, vol. EN300743, No. V1.2.1, Jun. 2002, XP014001876 Sophia Antipolis, FR.
European Search Report dated Aug. 30, 2007.
Digital Video Broadcasting (DVB); Subtitling Systems, ETSI EN 300 743 V1.2.2 (Jun. 2002).
Office Action for corresponding Malaysian application dated Mar. 28, 2008.
International Search Report Dated May 12, 2005.
Search Report for corresponding European application dated Jul. 18, 2008.
Taiwanese Office Action dated Aug. 15, 2008.
Decision on Grant for corresponding Russian Application No. 2006131586 dated Sep. 26, 2008.
Office Action for corresponding Chinese Application No. 200480041313.6 dated Dec. 19, 2008.
Office Action for corresponding Russian Application No. 2006137710/28(041038) dated Feb. 26, 2009.
Office Action for corresponding Russian Application No. 2006137710/28(041038) dated Jun. 29, 2009.
Office Action for corresponding European Application No. 04 793 460.9 dated Sep. 7, 2009.
European Search Report dated Sep. 30, 2009.
Office Action for corresponding U.S. Appl. No. 11/070,239 dated Nov. 13, 2009.
Office Action for corresponding Japanese Application No. 2007-504874 dated Dec. 25, 2009.
Japanese Office Action dated Jan. 22, 2010 with English translation for corresponding Japanese Application No. 2007-309215.
United States Office Action dated Mar. 5, 2010 for corresponding U.S. Appl. No. 11/980,438.
Office Action for corresponding U.S. Appl. No. 11/070,239 dated Apr. 8, 2010.
Chinese Patent Gazette dated Apr. 14, 2010 for corresponding Chinese Patent Application No. 200580009431.3.
Office Action for European patent application No. 04726671.3 dated Sep. 3, 2010.
"Digital Video Broadcasting (DVB); Subtitling systems," ETSI Standards, European Telecommunications Standards Institute, Sophia-Antipo, FR, vol. BC, No. V1.2.1, Jun. 2002, XP014001876 ISSN: 0000-0001.
Microsoft Corporation: "Understanding SAMI 1.0," Microsoft Developers Network, [Online] Oct. 1, 2001, XP007902747 Retrieved from the Internet: URL:http://msdn2.microsoft.com/en-us/library/ms971327(d=printer).aspx [retrieved on Aug. 6, 2007].
Notice of Allowance for Japanese patent application No. 2007-504874 dated Sep. 10, 2010 with English translation.
Office Action for Japanese patent application No. 2006-550924 dated Nov. 19, 2010.
Chinese Patent Gazette for Chinese patent application No. 200480041313.6 dated Oct. 6, 2010.
Office Action for Korean patent application No. 10-2005-7019021 dated Nov. 30, 2010.
Office Action for Japanese patent application No. 2007-309215 dated Nov. 19, 2010.
Chinese Patent Gazette for Chinese Patent Application No. 200480041314.0 dated Nov. 10, 2010.
"HTML 4.01 Specification, Section 9 "Text"", Dec. 24, 1999, pp. 1-13, retrieved from the Internet: URL:http://www.w3.org/TR/1999/REC-html401-19991224/struck/text.html [retrieved on Nov. 20, 2010].
Notice of Allowance for European patent application No. 04726671.3 dated Feb. 4, 2011.
European Office Action dated Apr. 8, 2011 issued in corresponding European Application No. 04 79 3461.7.
Office Action for corresponding Chinese Application No. 200480011769.8 dated Apr. 8, 2011 and English translation thereof.
Korean Notice of Allowance dated May 31, 2011 issued in corresponding Korean Application No. 10-2005-7019021.
Notice of Allowance for Korean patent application No. 10-2006-7022274 dated Jun. 29, 2011 (with English translation).

\* cited by examiner

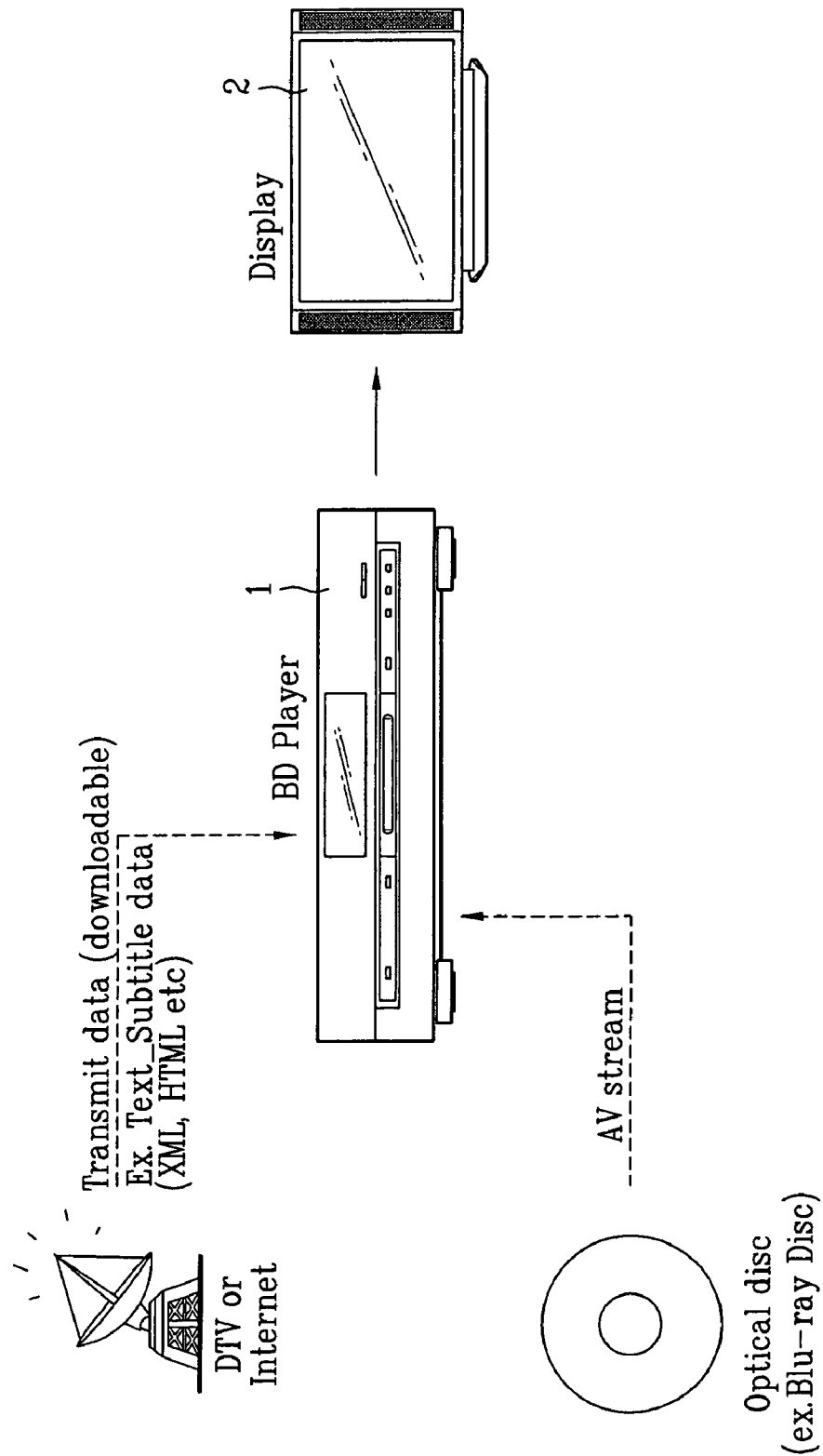

FIG. 5A

PCS information

```
Page_Composition_Segment () {
    segment_type
    segment_length
    composition_number
    ......
        composition_object () {
            object_id
            object_position_info
            object_cropping_info
            ......
            (global) style_page
        }
}
``` e.g.,
region_position
region_size
region_background_color
text_position
text_flow
text_alignment
line_space
font_id
font_style
font_size
font_color

RECORDING MEDIUM AND RECORDING AND REPRODUCING METHODS AND APPARATUSES

This application claims the benefit of Korean Patent Application No. 10-2004-0006990, filed on Feb. 3, 2004, which is hereby incorporated by reference.

BACKGROUND OF THE INVENTION

1. Field of the Invention

The present invention relates to a recording medium for reproduction of text subtitle streams, and methods and apparatuses for recording and reproducing the same.

2. Discussion of the Related Art

Optical discs are widely used as an optical recording medium for recording mass data. Presently, among a wide range of optical discs, a new high density optical recording medium (HD-DVD), such as the Blu-ray Disc (hereafter referred to as "BD"), is under development for writing and storing high definition video and audio data for a long period of time. Currently, global standard technical specifications of the Blu-ray Disc (BD), which is known to be the next generation HD-DVD technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle information, are not completely consolidated, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a recording medium for reproduction of text subtitle streams, and methods and apparatuses for recording and reproducing the same, all of which substantially obviate one or more problems due to limitations and disadvantages of the related art.

An object of the present invention is to define specific reproduction control information in each text subtitle stream such that text data for a text subtitle included in each text subtitle stream could be reproduced in a standardized manner.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one aspect of the present invention, a recording medium for reproduction of text subtitle streams includes a data area storing at least one text subtitle stream. Each text subtitle stream stored in the data area includes text data to be displayed within a text subtitle region of a display screen, region style information, and inline style information. The region style information initially specifies a region style of the text subtitle region including an overall style of the text data. The overall style of the text data is specified by at least one of font identification, a font style, a font size, and a font color defined in the region style information. The inline style information applies a different style to a specific portion of the text data.

In another aspect of the present invention, a method of recording text subtitle streams on a recording medium includes the step of recording at least one text subtitle stream on the recording medium. Each text subtitle stream being recorded on the recording medium includes text data to be displayed within a text subtitle region of a display screen, region style information specifying a region style of the text subtitle region including an overall style of the text data, and inline style information for applying a different style to a specific portion of the text data.

In another aspect of the present invention, a method of reproducing text subtitle streams recorded on a recording medium includes the step of reading at least one text subtitle stream from the recording medium. Each text subtitle stream being read from the recording medium includes text data to be displayed within a text subtitle region of a display screen, region style information specifying a region style of the text subtitle region including an overall style of the text data, and inline style information for applying a different style to a specific portion of the text data.

In another aspect of the present invention, an apparatus for recording text subtitle streams on a recording medium includes a driver driving an optical recording device to record data on the recording medium, and a microprocessor coupled to the driver for controlling operation of the driver to record at least one text subtitle stream on the recording medium. Each text subtitle stream recorded by the optical recording medium includes text data to be displayed within a text subtitle region of a display screen, region style information specifying a region style of the text subtitle region including an overall style of the text data, and inline style information for applying a different style to a specific portion of the text data.

In a further aspect of the present invention, an apparatus for reproducing text subtitle streams on a recording medium includes a driver for driving an optical reproducing device to reproduce data recorded on the recording medium, and a microprocessor coupled to the driver for controlling operation of the driver to reproduce at least one text subtitle stream recorded in the recording medium. Each text subtitle stream reproduced by the optical reproducing device includes text data to be displayed within a text subtitle region of a display screen, region style information specifying a region style of the text subtitle region including an overall style of the text data, and inline style information for applying a different style to a specific portion of the text data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 illustrates an optical (e.g., Blu-ray) disc player according to the present invention;

FIG. 5A illustrates an example of a page composition segment (PCS) information included in a text subtitle stream according to the present invention;

DETAILED DESCRIPTION OF THE INVENTION

Figure 2A:
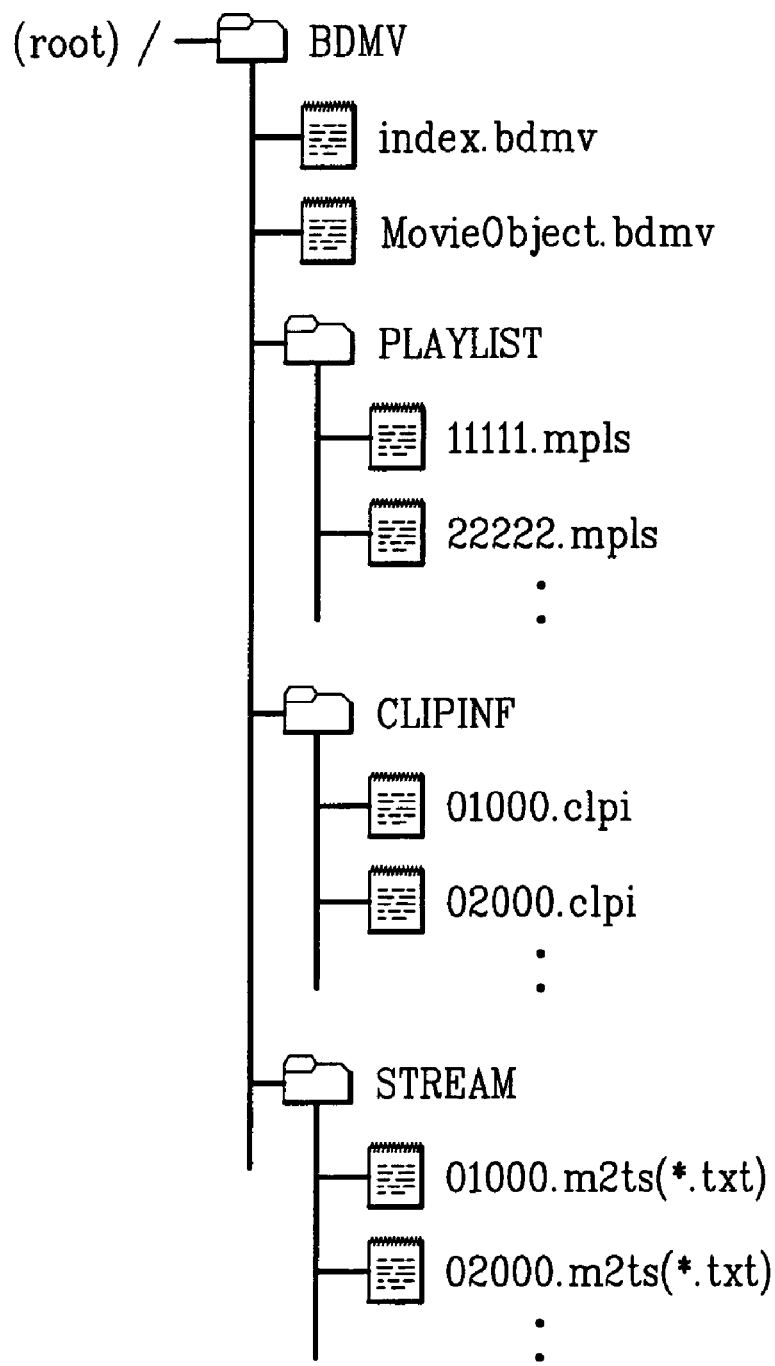
FIG. 2A illustrates data files recorded in an optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts.

In this description, main data represent audio/video (AV) data that are recorded on an optical disc by an author and belong to a title (e.g., a movie title). In general, the AV data are recorded in MPEG2 format and are often called AV streams or main AV streams. In addition, supplementary data represent all other data associated with reproduction of the main data, examples of which are text subtitle streams, graphic streams, menu information, and supplementary audio streams (e.g., for a browsable slideshow). These supplementary data streams may be recorded in MPEG2 format or any other data format, and they could be multiplexed with the AV streams or exist as independent data files in a same or different data area within the optical disc.

According to the present invention, a subtitle represents caption information for images being reproduced and is often represented in a predetermined language. For example, when a user selects an option for viewing one of a plurality of subtitles for multiple languages while viewing images on display screen, caption information corresponding to the selected option is displayed on a predetermined portion of the display screen. The caption information may be recorded in an optical disc as MPEG2 transport packets, bitmap graphics, or text data. When the caption information is text data, the subtitle is called a text subtitle. A text subtitle stream includes text data for a text subtitle and reproduction control information for the text data. According to one example the present invention, a text subtitle stream may be recorded in an optical disc and exist as an independent stream file. In addition, the text subtitle stream may be downloaded from an external data source.

FIG. 1 illustrates an optical disc player 1 according to the present invention. The disc player 1 is able to reproduce text subtitle streams and audio/video (AV) streams recorded in an optical disc, an example of which is a Blu-ray disc. Also, the disc player 1 is also able to record text subtitle streams and AV streams on an optical disc.

In addition, the disc player 1 according to the present invention is able to receive or download input data from an external data source, examples of which are a digital television broadcasting station and the Internet server. After the disc player 1 performs the required data-processes for the input data, it displays the processed signals on a display device 2 coupled to the disc player 1. Therefore, the disc player 1 is able to receive AV streams and text subtitle streams from the optical disc or the external data source, respectively, and to reproduce AV streams and the text subtitle data simultaneously. The text subtitle data may be in MPEG format, text, XML, or HTML format.

FIG. 2A illustrates data files recorded in a Blu-ray (BD) disc according to the present invention. Referring to FIG. 2A, at least one BD directory (BDMV) is included in a root directory (root). Each BD directory includes an index file (e.g., index.bdmv) and an object file (e.g., MovieObject.bdmv), which represent general files that are used when interacting with one or more users. For example, the index file contains data representing an index table which includes various information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF).

The stream directory includes audio/video (AV) stream files and supplementary stream files including one or more text subtitle stream files. The main AV streams and the text subtitle streams may be in the form of MPEG2 transport packets and be named as "*.m2ts", as shown in FIG. 2A. The text subtitle stream files exist as independent stream files within the stream directory. In addition, the text subtitle stream files could be in other data format and be named according to their data format. For example, if the text subtitle stream files are in text format, they could be named as "*.txt."

Next, the clip information directory includes clip information files (*.clpi) that correspond to the AV and text subtitle stream files included in the stream directory. A clip information file includes property information and timing information of a corresponding stream file, where timing information includes mapping information that maps presentation time stamp (PTS) with source packet number (SPN) using entry point map. In the industry standard, each pair of a stream file and its corresponding clip information file is designated as a clip. For example, 01000.clpi included in CLIPINF includes the property and timing information of 01000.m2ts included in STREAM, and 01000.clpi and 01000.m2ts form a clip.

Referring back to FIG. 2A, the playlist directory includes one or more PlayList files (*.mpls), wherein each PlayList file includes at least one PlayItem which designates at least one main AV clip and the reproduction time for the main AV clip. More specifically, a PlayItem includes information designating beginning and ending times (In-Time and Out-Time) for reproduction of a main AV clip, which may be designated by Clip_Information_File_Name within the PlayItem. Therefore, a PlayList file represents the basic reproduction control information for one or more main AV clips. In addition, the PlayList file may further includes a SubPlayItem, which is the basic reproduction control information of one or more text subtitle stream files. When a SubPlayItem is included in a PlayList file to reproduce one or more text subtitle streams, the SubPlayItem is often synchronized with PlayItem(s) also included in the PlayList file. In addition, when the SubPlayItem is used to reproduce a browsable slideshow, it may not be synchronized with the PlayItem(s).

Figure 2B:
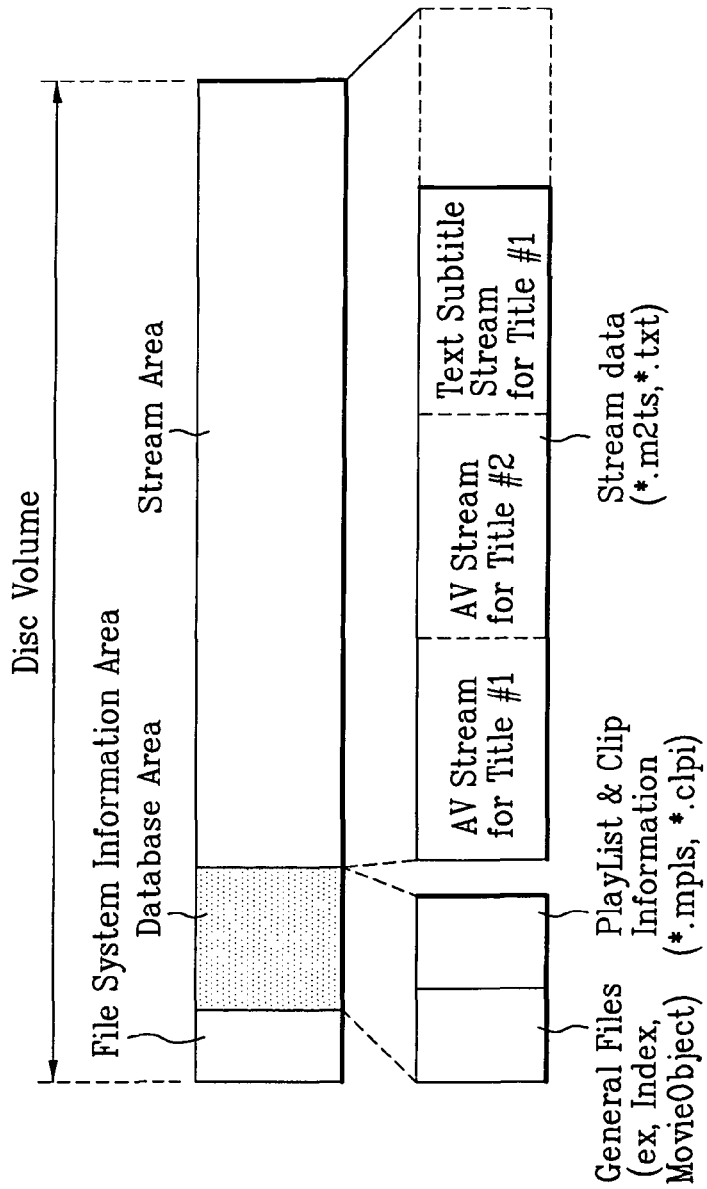
FIG. 2B illustrates data storage areas of an optical disc according to the present invention.

FIG. 2B illustrates data storage areas of an optical disc, in which the data files shown in FIG. 2A are recorded. As shown in the figure, the disc volume includes a file system information area occupying the inmost portion of the disc volume, a stream area occupying the outmost portion of the disc volume, and a database area occupied between the file system information area and the stream data area. In the file system information area, system information for managing the entire data files is recorded. Next, AV streams and one or more text subtitle streams are prerecorded in the stream area. The general files, PlayList files, and clip information files are recorded in the database area of the disc volume. As discussed above, the general files include an index file and an object file, and the PlayList files and clip information files include information required to reproduce the AV streams and text subtitle streams recorded in the stream area. A user is able to select a specific play-back mode and to reproduce desired main and supplemental streams in the selected play-back mode using the information stored in the database area and/or stream area.

Figure 3A:
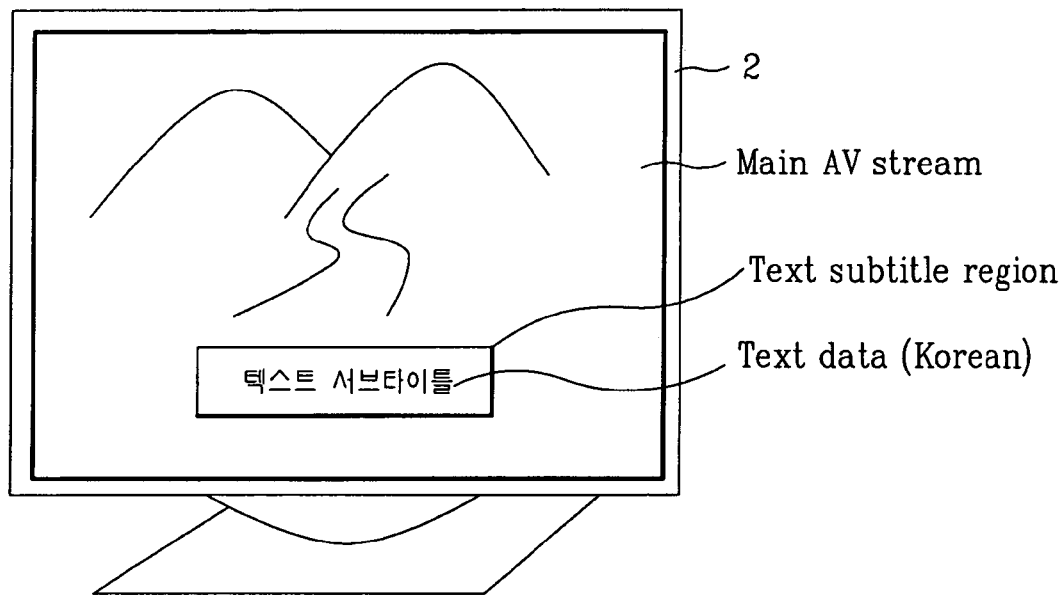
FIGS. 3A and 3B illustrate examples of a text subtitle region displayed on a display screen according to the present invention.
Figure 3B:
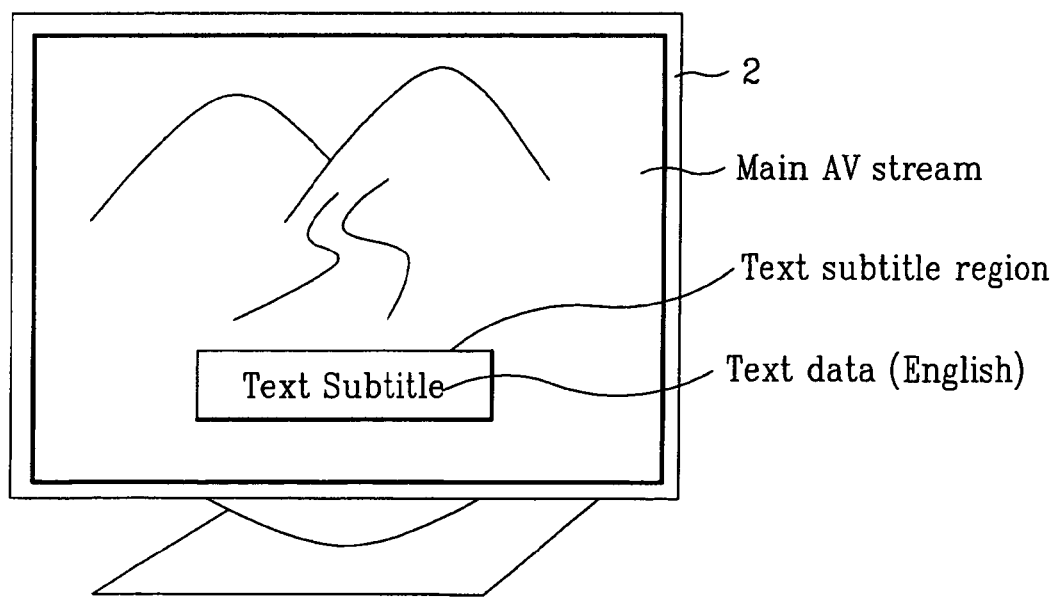

FIGS. 3A and 3B illustrate examples of a text subtitle displayed on a display screen 2 according to the present invention. A text subtitle stream recorded on an optical disc includes data representing a subtitle text (e.g., characters). When the text subtitle stream is reproduced, a text subtitle region including the text data is displayed on the display screen 2, as shown in both figures. The text data included within the text subtitle region shown in FIG. 3A is in Korean, and the text data displayed within the region shown in FIG. 3B is in English. In order to support both languages, there are more than one independent text subtitle files recorded in the optical disc.

In conclusion, one or more text subtitle streams according to the present invention may be provided from an optical disc, in which the text subtitle streams exist as one or more text subtitle stream files. Or, they could be provided from an external data source, as shown in FIG. 1. The text subtitle streams may be in MPEG format or any other data format (e.g., text format).

Figure 4:
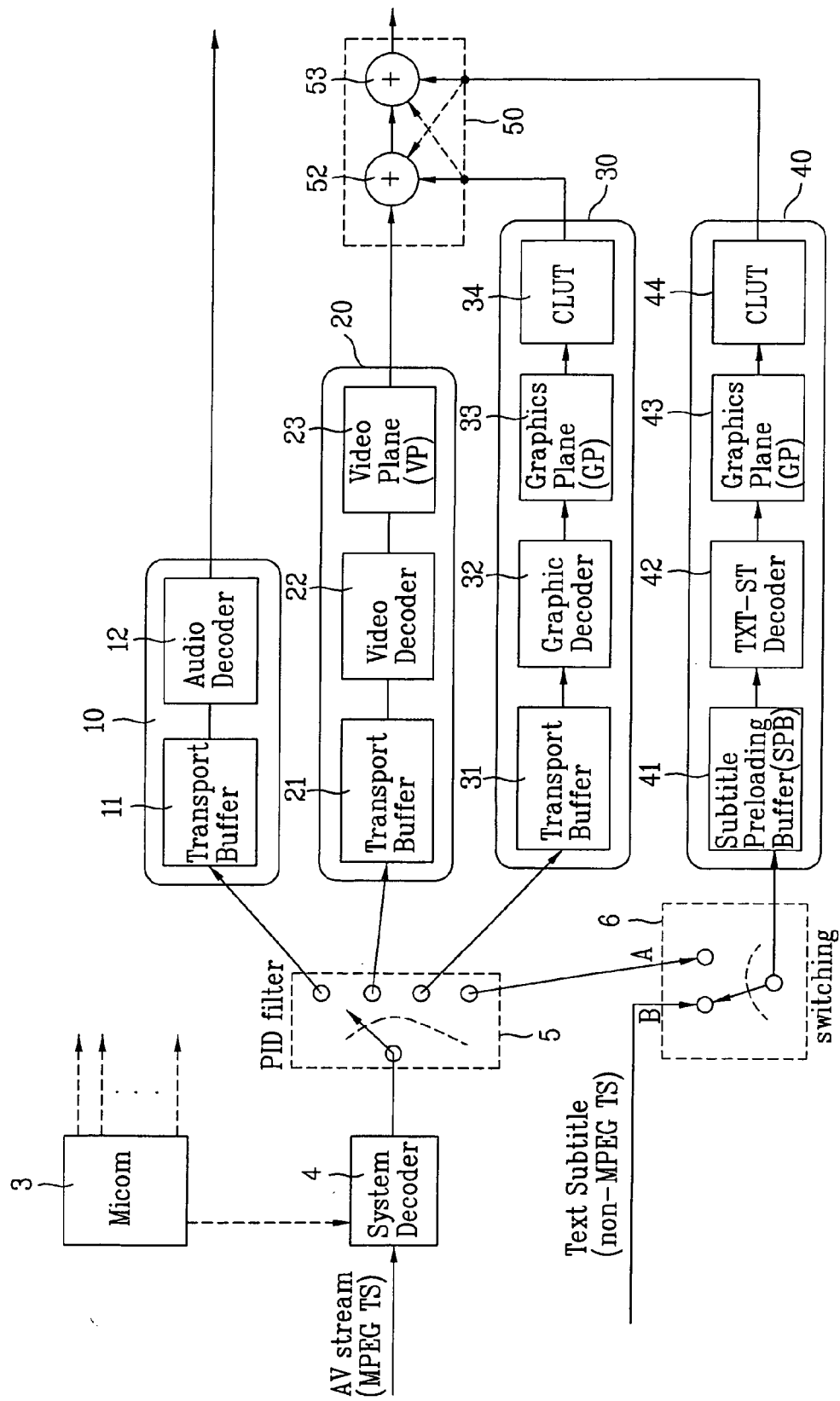
FIG. 4 illustrates an apparatus for decoding AV streams and text subtitle streams according to the present invention.

FIG. 4 illustrates an apparatus of decoding AV streams and text subtitle streams according to the present invention. The apparatus includes a packet identifier (PID) filter 5 for separating input streams into video streams, audio streams, graphic streams, and text subtitle streams based on their packet identifiers, an audio decoding part 10 for decoding the audio streams, a video decoding part 20 for decoding the video streams, a graphic decoding part decoding the graphic streams, and a text subtitle decoding part 40 for decoding the text subtitle streams.

The text subtitle streams may be extracted from an optical disc, or they could be inputted from an external data source. For this reason, the apparatus shown in FIG. 4 includes a switch 6 which selects a data source. For example, if a text subtitle stream in MPEG format is extracted from the optical disc, the switch 6 selects data line A connected to the PID filter 5. On the other hand, if a text subtitle stream in other format (e.g., text, XML, or HTML format) is inputted through the external source, the switch 6 selects data line B which is connected to the external source.

Each of the audio decoding part 10, video decoding part 20, and graphic decoding part 30 includes a transport buffer 11, 21, and 31 for storing a predetermined size of data streams to be decoded. A video plane 23 and a graphics plane 33 are included in the video decoding part 20 and the graphic decoding part 30, respectively, for converting decoded signals into displayable images. The graphic decoding part 30 further includes a color look up table (CLUT) 34 for controlling color and transparency levels of the displayable images.

When the text subtitle decoding part 40 receives one or more text subtitle streams from the switch 6, all of these streams are initially preloaded into a subtitle preloading buffer (SPB) 41 at once. Assuming a typical size of a text subtitle stream file for a single language is about 0.5 megabytes, the size of the subtitle preloading buffer 41 should be greater than 0.5 megabytes. In order to ensure seamless presentation of a text subtitle when a user switches among subtitle stream files supporting multi-languages, the size of the subtitle preloading buffer 41 should be determined based on the a total number of the text subtitle stream files. The buffer size must be large enough to preload all the required text subtitle stream files at once. Since all the text subtitle stream files are preloaded into the subtitle preloading buffer 41, extraction and use of the text subtitle streams can be done in a time-efficient manner. Also, the control of the subtitle preloading buffer 41 could be quite simple due to the reason set forth.

The text subtitle decoding part 40 further includes a text subtitle (TXT_ST) decoder 42 which decodes one or more text subtitle streams stored in the subtitle preloading buffer 41, a graphics plane 43 for converting the decoded subtitle stream(s) into displayable images, and a color look up table (CLUT) 44 for controlling the color and transparency levels of the converted images.

An image superimposition part 50 included in the apparatus shown in FIG. 4 combines the images outputted from the video decoding part 20, the graphic decoding part 30, and the text subtitle decoding part 40. These combined images are displayed on a display screen. The video images outputted from the video plane 23 of the video decoding part 20 are displayed as a background of the display screen, and the images outputted from the graphic decoding part 30 and/or the text subtitle decoding part 40 are superimposed over the displayed video images. For example, if the output images of the graphic decoding part 30 are interactive graphic images, the text subtitle images outputted form the text subtitle decoding part 40 are initially superimposed over the video images by a first adder 52. Thereafter, the interactive graphic images are further superimposed over the subtitle-superimposed images by a second adder 53. On the other hand, if the output images of the graphic decoding part 30 are presentation graphic images, these images are initially superimposed over the video images from the video decoding part 20 by the first adder 52, and the text subtitle images from the text subtitle decoding part 40 are further superimposed over the video images by the second adder 53.

The apparatus shown in FIG. 4 further includes a system decoder 4 for decoding input data streams extracted from an optical disc, and a microprocessor 3 for controlling operations of all the mentioned components of the apparatus.

Reference will now be made in detail to specific information/data included in a text subtitle stream according to the present invention. A text subtitle stream file recorded on an optical disc according to the present invention includes a page composition segment (PCS) information including region (global) style information, and an object definition segment (ODS) information including data representing a subtitle text (e.g., characters) and inline (local) style information. When the text subtitle stream file is reproduced, a text subtitle region including the subtitle text is displayed on a display screen according to the region style information and the inline style information.

An example of the page composition segment (PCS) information is illustrated in FIG. 5A. An object defined in the PCS information represents a text subtitle region (page) and an entire portion of the text included in the text subtitle region. The PCS information includes object composition information (composition_object (*)) including object identification (object_id), object position information (object_position_info), and object cropping information (object_cropping_info) for an object. The PCS information further includes information specifying a style of the text subtitle region displayed within the display screen, and this information is often denoted as region style information or global style information (global style_page shown in FIG. 5A). For simplicity, it will be referred to as region style information.

The region style information specifies a region style of a text subtitle region including a subtitle text, where the region style includes an overall style (font-related) of the subtitle text included within the text subtitle region. For example, the region style information specifies the region style by defining a plurality of display properties required for displaying the text subtitle region including subtitle text on the display screen. For example, the region style information may define a region position (region_position) indicating at least one of the horizontal and vertical positions of the text subtitle region from an origin of the display screen, a region size (region_size) indicating at least one of a width and height of the text subtitle region, and a region background color (region_background_color) indicating a background color of the text subtitle region. The region style information may further define a text position (text_position) indicating a position of the text data within the text subtitle region, a text flow (text_flow) indicating at least one a character progression (left-to-right or right-to-lest) and a line progression (top-to-bottom or bottom-to-top) of the text data within the text subtitle region, a text alignment (text_alignment) indicating one of left, center, right alignment of the text data within the text subtitle region, a line space (line_space) indicating a distance between two adjacent baselines of the text data within the text subtitle region. The region style information could also define other display properties not mentioned above.

The region style information further specifies the region style by defining an overall style (font-related) of the subtitle text included in a text subtitle region. For example, the region style information may further define a font identification (font_id) indicating a value specifying a font file associated with the text subtitle stream file including the region style information, a font style (font_style) indicating at least one normal, bold, and italic font styles, a font size (font_size) indicating a vertical size of the text included in the text subtitle region (e.g., a character), and a font color (font_color) indicating a color of the text. As described above, the overall style of the subtitle text within the text subtitle region is specified by at least one of the font identification, font style, font size, and font color defined in the region style information.

Figure 5B:
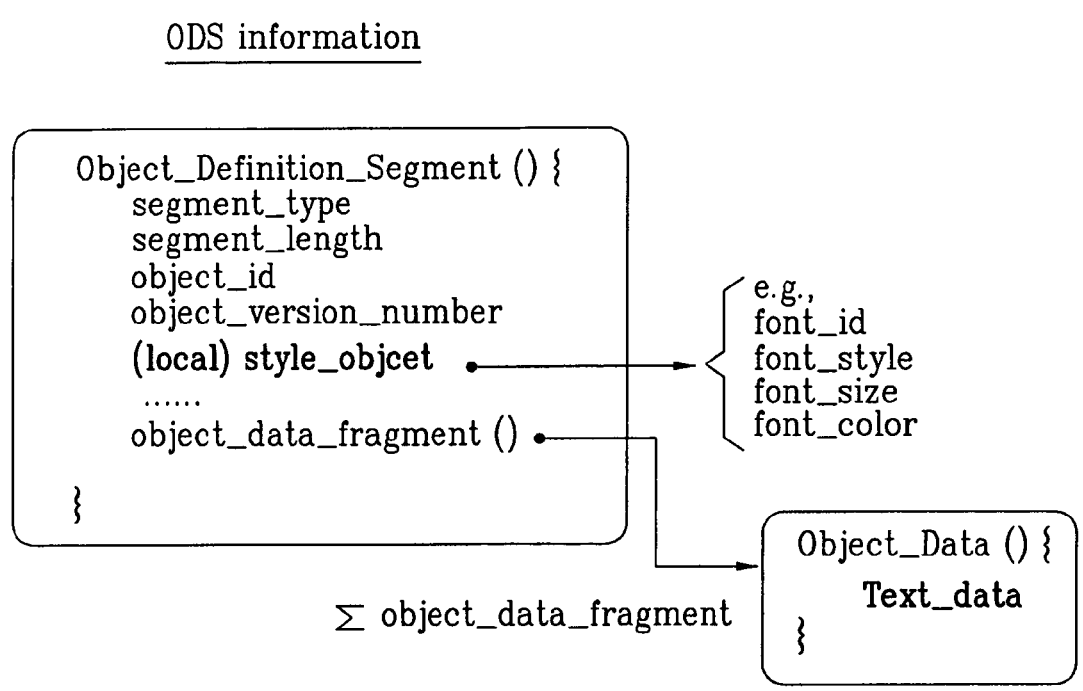
FIG. 5B illustrates an example of an object definition segment (ODS) information included in a text subtitle stream according to the present invention.

FIG. 5B illustrates an example of the object definition segment (ODS) information included in a text subtitle stream. An object defined by object identification (object_id) in the ODS information represents a specific portion of a subtitle text (e.g., characters) included in a text subtitle region. The ODS information includes object information including object identification (object_id) and object version information (object_version_number) for an object. The ODS information further include information for applying a different style (font-related) to a specific portion of the text included in a text subtitle, and this information is often denoted as inline style information or local style information (local style_object shown in FIG. 5B). For simplicity, it will be referred to as inline style information.

An object of the local style information is to apply a different font-related style for a specific portion of the subtitle text included in a text subtitle region. In other words, the local style information specifies a specific font-related style of the specific text portion, which may be different from the overall font-related style defined by the region style information. For example, the inline style information specifies the specific font-related style by redefining at least one of a font identification (font_id) indicating a value specifying a different font file associated with the text subtitle stream, a font style (font_style) indicating a different font style, a font size (font_size) indicating a different font size, and a font color (font_color) indicating a different font color for the specific text portion within the text subtitle region. In addition, the inline style information may further define various other font-related display properties not mentioned above.

Referring back to FIG. 5B, the ODS information further includes data (Text_data) representing a subtitle text included in a text subtitle region. This text data may be included object data information (Object_Data), which is included in object_data_fragment, as shown in FIG. 5B. However, the text data may be included in the ODS in other manner.

A text subtitle stream file may further include palette information for use with a color look up table (CLUT). This palette information may be included in palette definition segment (PDS) information further included in the text subtitle stream file, or it may be included in a clip information file corresponding to the text subtitle stream. Alternatively, the palette information may be included in the PCS information shown in FIG. 5A.

Figure 6A:
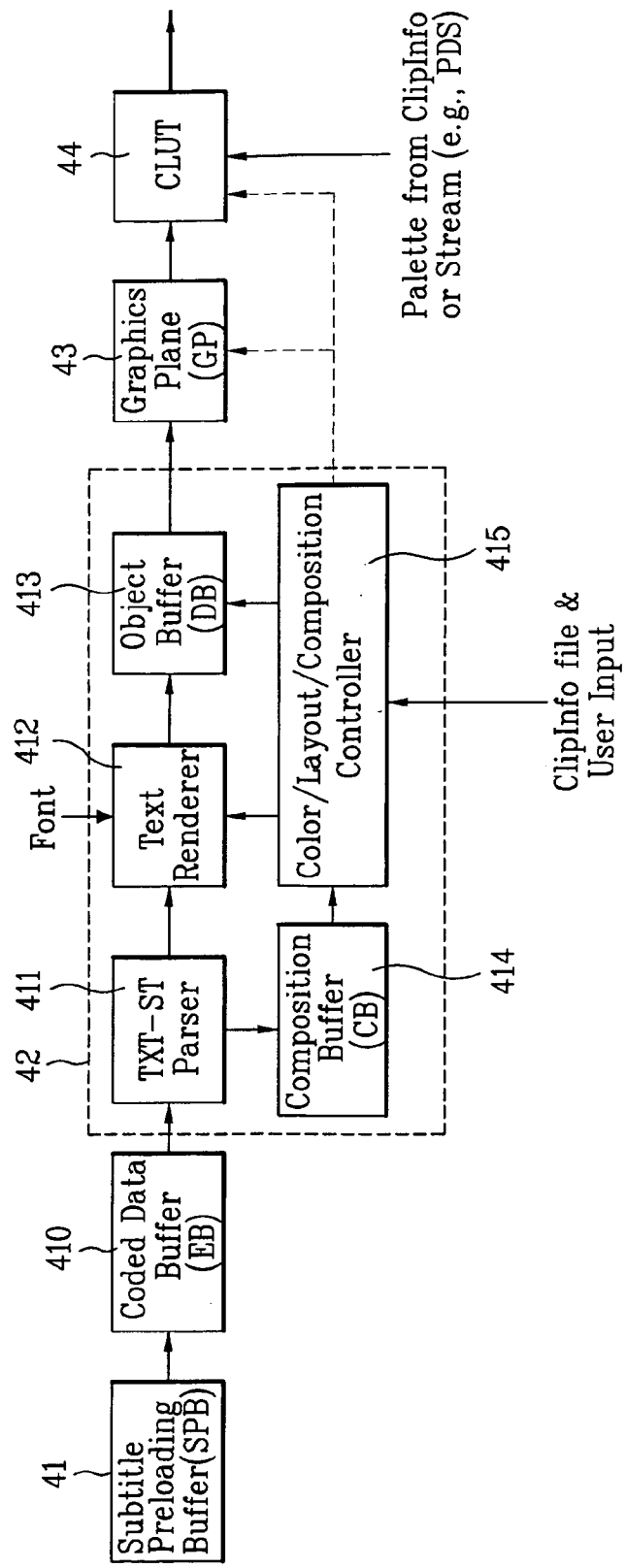
FIGS. 6A to 6D illustrate several examples of the text subtitle decoder shown in FIG. 4 according to the present invention.

FIG. 6A illustrates a first example of the text subtitle decoder 42 shown in FIG. 4 according to the present invention, where a text subtitle stream is provided from an optical disc. The PCS information and ODS information included in a text subtitle stream preloaded in the subtitle preloading buffer (SPB) 41 may be initially arranged in the order of their information-type and be stored in a coded data buffer (EB) 410. However, this process is only for improving an overall efficiency of the text subtitle decoder 42, and it may be omitted. Therefore, the coded data buffer 410 is only for optional and may not be included in the text subtitle decoding part 40 shown in FIG. 6A.

Referring back to FIG. 6A, a text subtitle processor (TXT_ST parser) 411 included in the text subtitle (TXT_ST) decoder 42 parses the PCS and ODS information, which are preloaded in the subtitle preloading buffer (SPB) 41 or in the coded data buffer (EB) 410, into data representing a subtitle text (text data) to be displayed within a text subtitle region, inline style information, and region style information. When the PCS and ODS information are parsed by the text subtitle parser 411, the text data and the inline information are transferred to a text renderer 412 and the region style information is transferred to a composition buffer (CB) 414. Thereafter, the text renderer 412 renders the text data into bitmap data under control of a presentation (color/layout/composition) controller 415 using the region style information, the inline style information, and a font file. The font file may be extracted from an optical disc or a memory (not illustrated) included in the optical disc player 1 shown in FIG. 1.

The composition buffer (CB) 414 stores the region style information parsed by the text subtitle parser 411 and provides this information to the presentation controller 415. An object buffer (DB) 413 temporarily stores the bitmap data outputted from the text renderer 412 and outputs the stored data according to time information (e.g., presentation time stamps). The presentation controller 415 controls operations of the text renderer 412 and the object buffer (DB) 413 according to the region style information, the inline style information, a corresponding clip information file, and a user input.

Figure 6B:
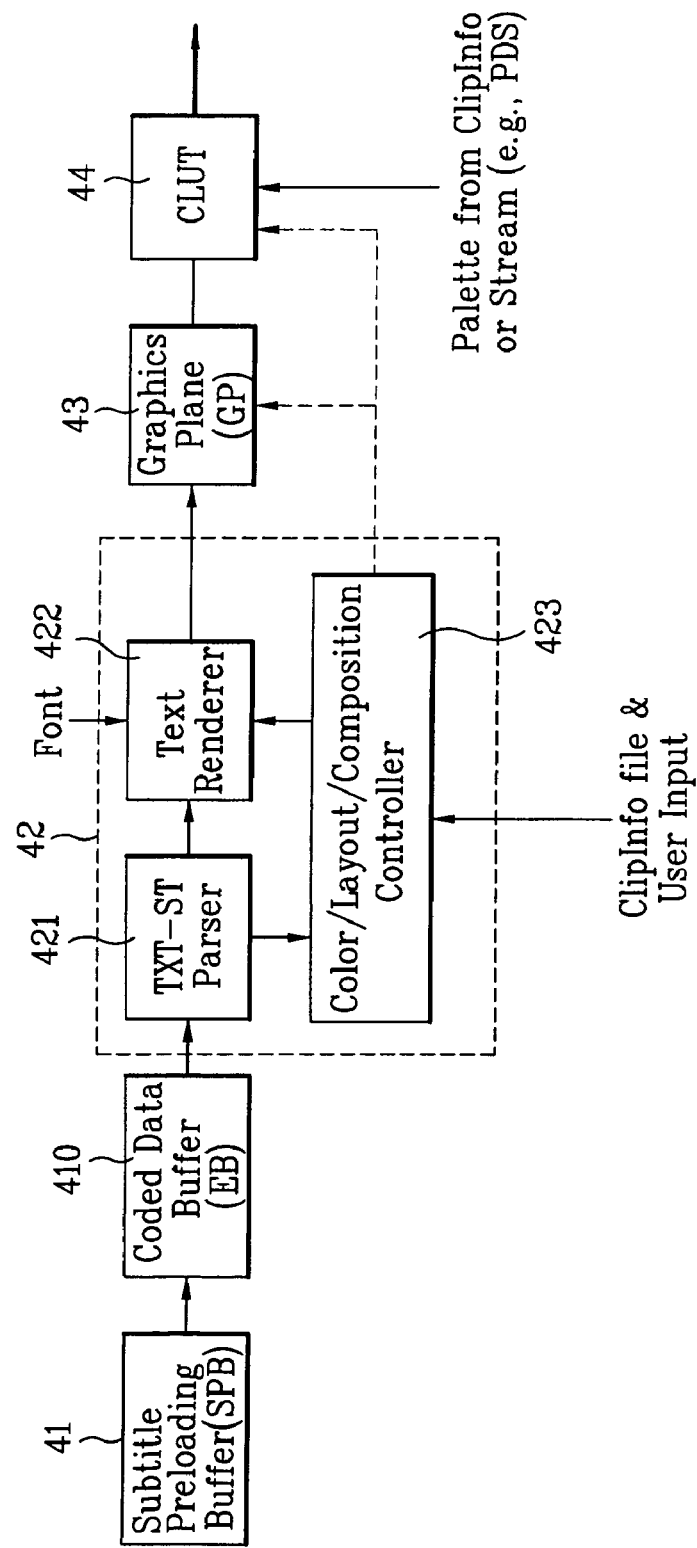

FIG. 6B illustrates a second example of the text subtitle decoder 42 shown in FIG. 4 according to the present invention, wherein a text subtitle stream is provided from an optical disc. The text subtitle decoder 42 shown in FIG. 6B does not include an object buffer and a composition buffer. A text subtitle processor (TXT_ST parser) 421 parses the text subtitle stream including PCS and ODS information into subtitle text data, inline style information, and region style information. When PCS and ODS information are parsed, the text data and inline style information are directly transferred to a text renderer 422 and the region style information is directly transferred to a presentation (color/layout/composition) controller 423. Thereafter, the text renderer 422 renders the text data into bitmap data under control of the presentation controller 423 using the region style information, inline style information, and a font file. The bitmap data is directly displayed through the graphics plane 43. Since the storing processes of the bitmap data and the region style information are omitted, the overall data process of the text subtitle decoder 42 is greatly simplified.

Figure 6C:
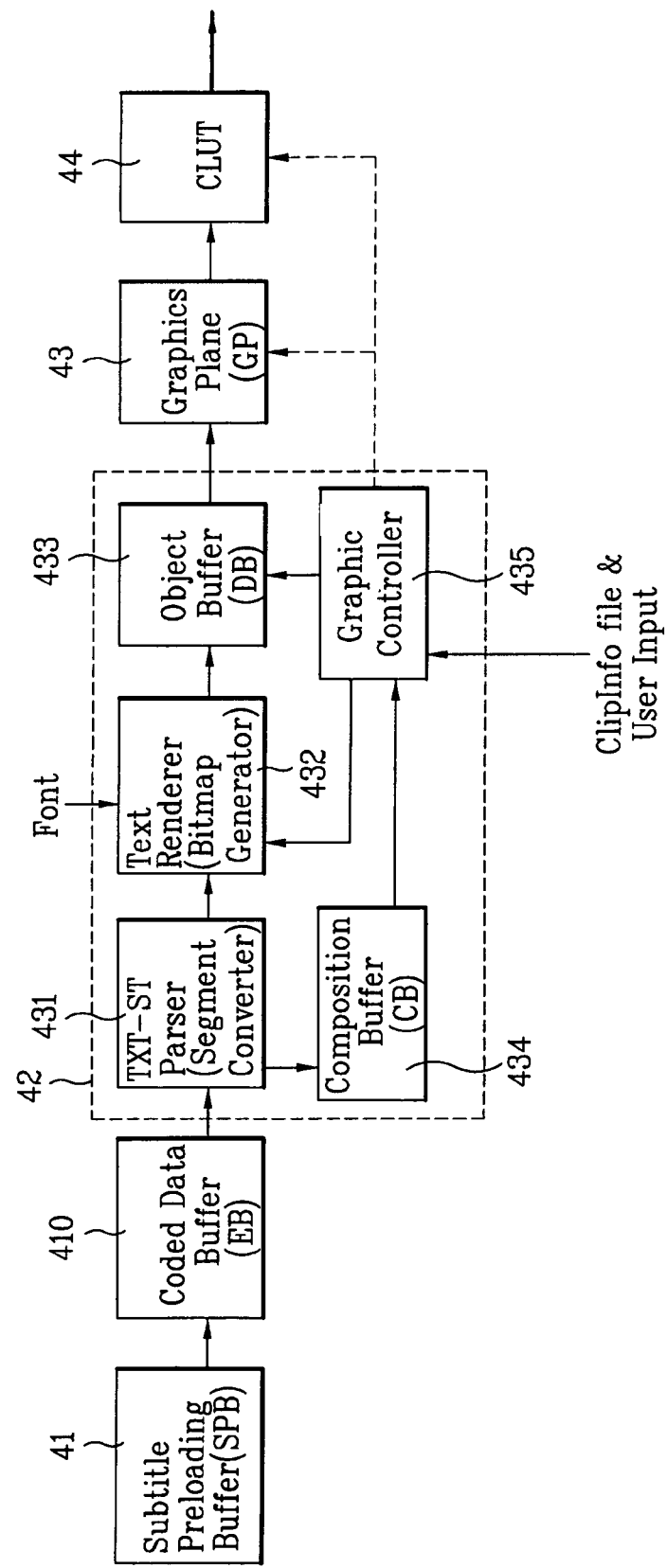
Figure 6D:
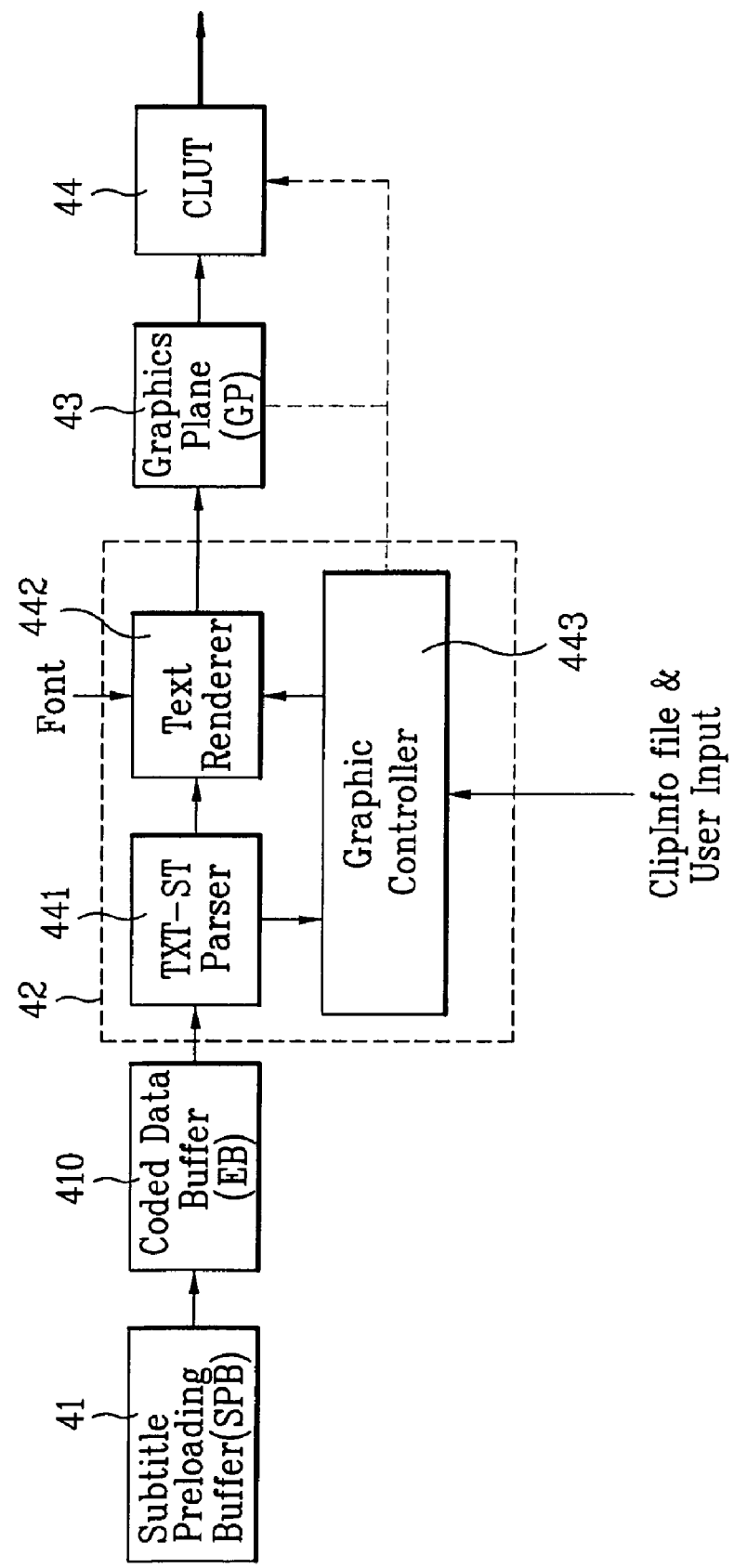

FIGS. 6C and 6D illustrate a third and fourth example of the text subtitle decoder 42 shown in FIG. 4 according to the present invention, where a text subtitle stream is provided from an external data source rather than from an optical disc. When a text subtitle stream includes data representing a subtitle text (text data) in XML or HTML format, the text data may include tag information (often referred to as "mark-up syntax") indicating property information of the text data. In the third example of the text subtitle decoder 42, pseudo-PCS (page composition segment) information and pseudo-ODS (object definition segment) information are created from the mark-up syntax. On the other hand, the mark-up syntax is directly used when reproducing or decoding the text subtitle stream. For this reason, the operations of the third and fourth examples of the text subtitle decoder 42 will be similar, in certain aspect, to those of the first and second examples shown in FIGS. 6A and 6B.

Referring to FIG. 6C, a text subtitle processor (TXT_ST parser or segment converter) 431 included in the text subtitle decoder 42 converts a text subtitle stream originally provided from the external data source into standardized information. For example, if the text subtitle stream is in XML format, it initially converts the data into pseudo-PCS information and pseudo-ODS information including subtitle text data, and parses these information into the text data, inline style information, and region style information. When the pseudo-PCS and pseudo-ODS information are parsed, the text data and inline style information are transferred to a text renderer (a bitmap generator) 432, and the region style information is transferred to a composition buffer (CB) 434. Thereafter, the text renderer 432 renders the text data into bitmap data under control of a graphic controller 435 using the region style information, the inline style information, and a font file. The font file may be extracted from an optical disc or a memory (not illustrated) included in the optical disc player 1 shown in FIG. 1.

The composition buffer 434 stores the region style information parsed by the text subtitle parser 431 and provides this information to the graphic controller 435. An object buffer (DB) 433 temporarily stores the bitmap data outputted from the text renderer 432 and outputs the stored data according to time information (e.g., presentation time stamps). The graphic controller 435 controls operations of the text renderer 432 and the object buffer 433 according to the region style information, the inline style information, a corresponding clip information file, and a user input.

Referring to FIG. 6D, a text subtitle processor (TXT_ST parser) 441 included in the text subtitle decoder 42 converts a text subtitle stream originally provided from the external data source into standardized information. For example, if the text subtitle stream is in XML or HTML format, it initially converts the data into pseudo-PCS information and pseudo-ODS information including subtitle text data, and parses these information into the text data, inline style information, and region style information. When the pseudo-PCS and pseudo-ODS information are parsed, the text data and inline style information are transferred to a text renderer (442), and the region information style information is transferred to a graphic controller 443. Thereafter, the text renderer 442 renders the text data into bitmap data under control of the graphic controller 443 using the region style information, the inline style information, and a font file. The converted bitmap data is simultaneously displayed through the graphics plane 43. Since the storing processes of the bitmap data and the region style information are not required, the overall data process of the text subtitle decoder 42 is greatly simplified.

Figure 7:
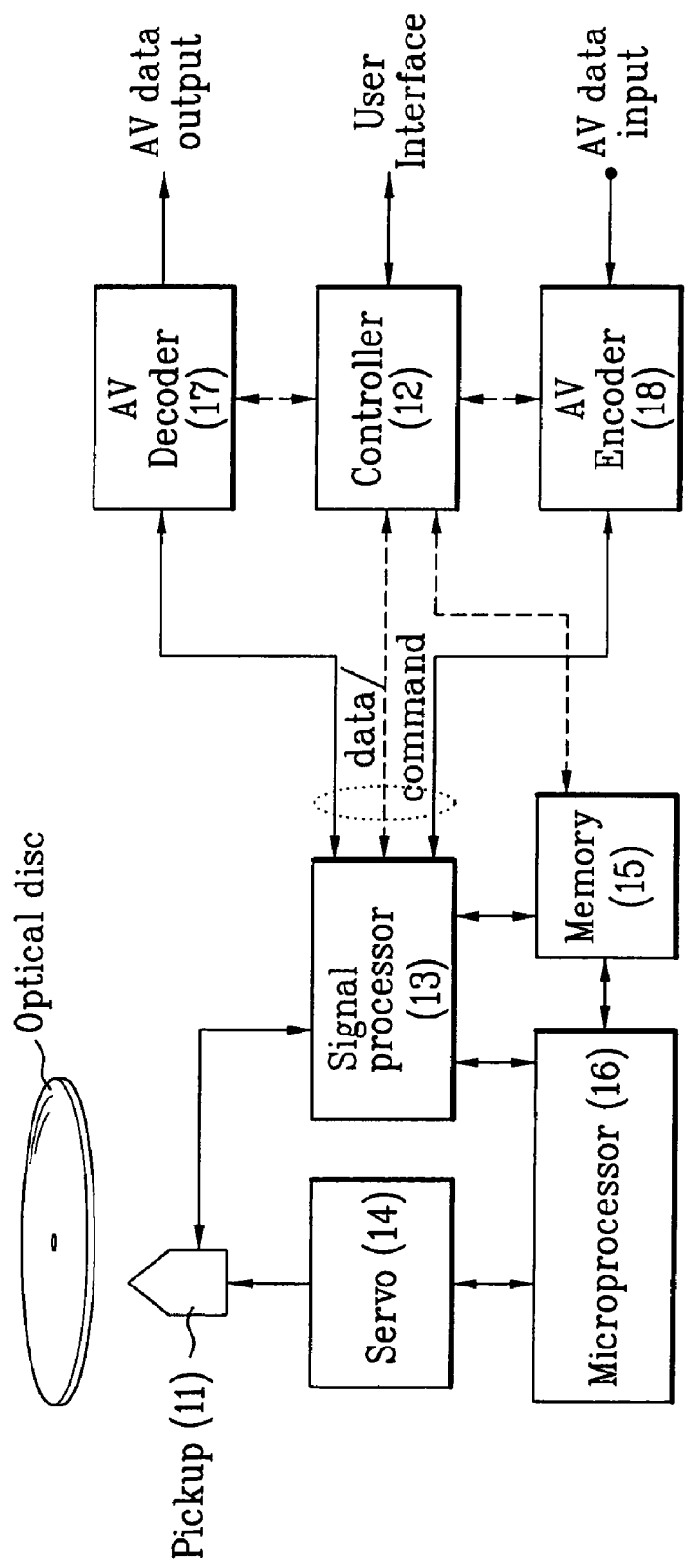
FIG. 7 illustrates an apparatus of recording and/or reproducing text subtitle streams according to the present invention.

FIG. 7 illustrates an apparatus of recording or reproducing text subtitle streams according to the present invention. The apparatus shown in FIG. 7 includes a pickup unit 11 that reads AV streams and one or more text subtitle streams from an optical disc. The pickup unit 11 is also able to record AV streams and one or more text subtitle streams into an optical disc. Each text subtitle stream being recorded on or read from the optical disc by the pickup unit 11 includes data representing a subtitle text (text data) to be displayed within a text subtitle region of a display screen, region (global) style information specifying a region style of the text subtitle region including an overall font-related style of the text data, and inline (local) style information for applying a different font-related style to a specific portion of the text data.

The apparatus further includes a driver (e.g., a servo) 14 which controls operation of the pickup unit 11, a signal processor 13 which restores a signal received from the pickup unit 11 or modulates a signal into a recordable signal, a memory 15 which stores reproduction control information included in the text subtitle streams, and a microprocessor 16 which controls operations of the driver 14, the signal processor 13, and the memory 15.

The apparatus shown in FIG. 7 further includes an AV decoder 17 decoding the AV signal received from the signal processor 13, and an AV encoder 18 converting an input AV signal into a signal having a particular format, such as MPEG2 transport streams, and transmitting the converted signal to the signal processor 13. In addition, the apparatus further includes a controller 12, which controls operations of the signal processor 13, the AV decoder 17, and the AV encoder 18.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical disc storing a data structure for managing reproduction of text subtitle stream by a reproducing apparatus, comprising:
   a data area storing a playlist including at least one playitem and at least first and second subplayitems, the playitem specifying a time based playing interval from in time until out time associated with at least one audio/video (AV) stream file including at least one audio/video (AV) stream and the first subplayitem specifying a time based playing interval from in time until out time associated with at least one text subtitle stream file including at least one text subtitle stream, the data area further storing the text subtitle stream including a first segment and a second segment, the first segment including region style information including a default style to be applied to a text subtitle region of a display screen by default, the second segment including text data to be displayed within the text subtitle region of the display screen and inline style information to be applied to a specific portion of the text data which overrides the region style information,
   wherein the first subplayitem indicates a plurality of independent text subtitle stream files having different language codes, respectively, and
   wherein the first subplayitem is associated with reproduction of the text subtitle stream and is synchronized with the playitem, and the second subplayitem is associated with reproduction of a browsable slideshow and is not synchronized with the playitem.

2. The optical disc of claim 1, wherein the at least one audio/video (AV) stream file and the text subtitle stream files are separate files.

3. The optical disc of claim 1, wherein the default style of the text subtitle region is specified by at least one of a region position, a region size, a region background color, a text position, a text flow, a text alignment, a line space, a font identification, a font style, a font size, and a font color defined in the region style information.

4. The optical disc of claim 3, wherein the font identification is defined in a clip information file of a corresponding text subtitle stream, the font identification specifying a font file associated with the default style defined in the region style information.

5. The optical disc of claim 3, wherein the font style specifies at least one of normal, bold, and italic font styles, and the font size represents a vertical size of a character in unit of pixels.

6. The optical disc of claim 3, wherein the region position specifies at least one of a horizontal position and a vertical position of the text subtitle region within the display screen, the region size specifying at least one of width and height of the text subtitle region, and the text flow specifying at least one of a character progression and a line progression of the text data within the text subtitle region.

7. The optical disc of claim 6, wherein the character progression direction is one of a left-to-right character progression and a right-to-left character progression and the line progression direction is one of a top-to-bottom line progression and a bottom-to-top line progression.

8. The optical disc of claim 3, wherein the text alignment specifies one of left, center, and right alignments and the line space specifies a distance between two adjacent baselines of the text data within the text subtitle region.

9. The optical disc of claim 1, wherein a different style is specified by at least one of a font identification, a font style, a font size, and a font color defined in the inline style information, the different style is different from the default style defined in the region style information.

10. A method of recording text subtitle stream on an optical disc, the method comprising:
    defining the text subtitle stream to include a first segment and a second segment, the first segment including region style information including a default style to be applied to a text subtitle region of a display screen by default, the second segment including text data to be displayed within the text subtitle region of the display screen and inline style information to be applied to a specific portion of the text data which overrides the region style information,
    defining, on the optical disc, a playlist including at least one playitem and at least first and second subplayitems, the playitem specifying a time based playing interval from in time until out time associated with at least one audio/video (AV) stream file including at least one audio/video (AV) stream and the first subplayitem specifying a time based playing interval from in time until out time associated with at least one text subtitle stream file including at least one text subtitle stream; and
    recording the defined text subtitle stream and the playlist on the optical disc,
    wherein the first subplayitem indicates a plurality of independent text subtitle stream files having different language codes, respectively, and
    wherein the first subplayitem is associated with reproduction of the text subtitle stream and is synchronized with the playitem, and the second subplayitem is associated with reproduction of a browsable slideshow and is not synchronized with the playitem.

11. The method of claim 10, wherein the at least one audio/video (AV) stream file and the text subtitle stream files are separate files.

12. The method of claim 10, wherein the default style of the text subtitle region is specified by at least one of a region position, a region size, a region background color, a text position, a text flow, a text alignment, a line space, a font identification, a font style, a font size, and a font color defined in the region style information.

13. The method of claim 12, wherein the font identification is defined in a clip information file of corresponding text subtitle stream, the font identification specifying a font file associated with the default style defined in the region style information.

14. The method of claim 10, wherein a different style is specified by at least one of font identification, a font style, a font size, and a font color defined in the inline style information, the different style is different from the default style defined in the region style information.

15. A method of reproducing text subtitle stream recorded on an optical disc, the method comprising:
    reading, from the optical disc, a playlist including at least one playitem and at least first and second subplayitems, the playitem specifying a time based playing interval from in time until out time associated with at least one audio/video (AV) stream file including at least one audio/video (AV) stream and the first subplayitem specifying a time based playing interval from in time until out time associated with at least one text subtitle stream file including at least one text subtitle stream;
    parsing the text subtitle stream into a first segment and a second segment, the first segment including region style information including a default style to be applied to a text subtitle region of a display screen by default, the second segment including text data to be displayed within the text subtitle region of the display screen and inline style information to be applied to a specific portion of the text data which overrides the region style information; and reproducing the text data by applying at least one of the region style information and the inline style information, wherein the first subplayitem indicates a plurality of independent text subtitle stream files having different language codes, respectively, and wherein the first subplayitem is associated with reproduction of the text subtitle stream and is synchronized with the playitem, and the second subplayitem is associated with reproduction of browsable slideshow and is not synchronized with the playitem.

16. The method of claim 15 wherein the at least one audio/video (AV) stream file and the text subtitle stream files are separate files.

17. The method of claim 15, wherein the reproducing step includes reproducing the text data by applying the default style, the default style of the text subtitle region being specified by at least one of a region position, a region size, a region background color, a text position, a text flow, a text alignment, a line space, a font identification, a font style, a font size, and a font color defined in the region style information.

18. The method of claim 17, wherein the reproducing step includes reproducing a clip information file of a corresponding text subtitle stream, the clip information file including a font identification specifying a font file associated with the default style defined in the region style information.

19. The method of claim 15, the reproducing step includes reproducing the text data by applying a different style to the specific portion of the text data, the different style being specified by at least one of a font identification, a font style, a font size, and a font color defined in the inline style information, the different style being different from the default style defined in the region style information.

20. An apparatus for recording text subtitle stream on an optical disc, the apparatus comprising:

a pickup configured to record data on the optical disc; and a controller configured to control the pickup to record the text subtitle stream including a first segment and a second segment, the first segment including region style information including a default style to be applied to a text subtitle region of a display screen by default, the second segment including text data to be displayed within the text subtitle region of the display screen and inline style information to be applied to a specific portion of the text data which overrides the region style information, the controller further configured to control the pickup to record a playlist including at least one playitem and at least first and second subplayitems, the playitem specifying a time based playing interval from in time until out time associated with at least one audio/video (AV) stream file including at least one audio/video (AV) stream and the first subplayitem specifying a time based playing interval from in time until out time associated with at least one text subtitle stream file including at least one text subtitle stream, wherein the first subplayitem indicates a plurality of text subtitle stream files having different language codes, respectively, and wherein the first subplayitem is associated with a reproduction of the text subtitle stream and is synchronized with the playitem. and the second subplavitem is associated with a reproduction of a browsable slideshow and is not synchronized with the playitem.

21. The apparatus of claim 20, wherein the default style of the text subtitle region is specified by at least one of a region position, a region size, a region background color, a text position, a text flow, a text alignment, a line space, a font identification, a font style, a font size, and a font color defined in the region style information.

22. The apparatus of claim 21, wherein the font identification is defined in a clip information file of corresponding text subtitle stream, the font identification specifying a font file associated with the default style defined in the region style information.

23. The apparatus of claim 20, wherein a different style is specified by at least one of font identification, a font style, a font size, and a font color defined in the inline style information, the different style is different from the default style defined in the region style information.

24. An apparatus for reproducing text subtitle stream recorded on an optical disc, the apparatus comprising:

a pickup configured to read data recorded on the optical disc; and a controller configured to control the pickup to read a playlist including at least one playitem and at least first and second subplayitems, the playitem specifying a time based playing interval from in time until out time associated with at least one audio/video (AV) stream file including at least one audio/video (AV) stream and the first subplayitem specifying a time based playing interval from in time until out time associated with at least one text subtitle stream file including at least one text subtitle stream, the first subplayitem indicating a plurality of independent text subtitle stream files having different language codes, respectively, the first subplayitem being associated with a reproduction of the text subtitle stream and being synchronized with the playitem, and the second subplayitem being associated with a reproduction of a browsable slideshow and not being synchronized with the playitem; and a text subtitle decoder configured to parse the text subtitle stream into a first segment and a second segment, the first segment including region style information including a default style to be applied to a text subtitle region of a display screen by default, the second segment including text data to be displayed within the text subtitle region of the display screen and inline style information to be applied to a specific portion of the text data which overrides the region style information, the text subtitle decoder being configured to render the text data by applying at least one of the region style information and the inline style information.

25. The apparatus of claim 24, wherein the controller is configured to control a reproduction of the text data by applying a different style to the specific portion of the text data, the different style being specified by at least one of a font identification, a font style, a font size, and a font color defined in the inline style information, the different style being different from the default style defined in the region style information.

26. The apparatus of claim 24, wherein the controller is configured to control a reproduction of the text data by applying the default style, the default style of the text subtitle region being specified by at least one of a region position, a region size, a region background color, a text position, a text flow, a text alignment, a line space, a font identification, a font style, a font size, and a font color defined in the region style information.

27. The apparatus of claim 26, wherein the controller is configured to control a reproduction of a clip information file of a corresponding text subtitle stream, the clip information file including a font identification specifying a font file associated with the default style defined in the region style information.

* * * * *